United States Patent Office.

ANSON L. MUNSON, OF EAST OAKLAND, ASSIGNOR OF ONE-HALF TO THOMAS G. McLERAN, OF SAN FRANCISCO, CALIFORNIA.

ANTI-FOULING PAINT.

SPECIFICATION forming part of Letters Patent No. 488,479, dated December 20, 1892.

Application filed November 20, 1891. Serial No. 412,564. (No specimens.)

*To all whom it may concern:*

Be it known that I, ANSON L. MUNSON, a citizen of the United States, residing at East Oakland, Alameda county, State of California, have invented an Improvement in Anti-Fouling Paints; and I hereby declare the following to be a full, clear, and exact description of the same.

My invention relates to that class of anti-fouling paints in which mercury is used.

It consists in the novel composition of matter forming the paint, and in the novel preparation of tar which forms a vehicle for the paint, as I shall now describe.

My composition of matter consists of the following ingredients combined in substantially the proportions stated: to wit: A novel preparation of tar (to be fully described) one gallon, peroxide of iron ($Fe_2O_3$) one and one-fourth pounds, mercurous chloride ($Hg_2Cl_2$) two and one-fourth pounds.

The first ingredient forms the vehicle and it is obtained as follows:—Coal tar is subjected to a heat of about 150° Fahrenheit. Then carbonate of ammonia [$(NH_4)_2CO_3$] in a sack is made to pass through the tar for about five minutes to cut it. The tar is then run off into a mixing machine, and while in motion therein two and one-half pounds of saturated solution of chloride of zinc ($ZnCl_2$) is added to every one hundred gallons of tar. The agitation is continued for about ten minutes, and then oil of turpentine, in the proportion of thirty gallons to every one hundred gallons of tar is gradually added and the agitation is continued for about fifteen minutes longer, when the process is complete.

The method of combining the ingredients of my composition is as follows:—While the preparation of tar is hot, at about a temperature of 100° Fahrenheit, the peroxide of iron is added, and the agitation continued for about twenty minutes. Then the mass is allowed to stand until entirely cool. This prepares it for the reception of the last ingredient, the mercurous chloride, which being added, the mass is agitated for about thirty minutes, completing the process. The peculiar spongy or porous condition of the mass holds in complete suspension the heavy minerals, and as a result there is no settling or precipitation. A paint is thus made ready for the brush and gives a uniform coating when applied. It is adapted for use on steel, iron, and wood, and is especially designed for application to ships' bottoms for the purpose of keeping the same clean and free of marine parasites.

The object of passing the carbonate of ammonia through the tar is to neutralize its acidity. The mercurous chloride furnishes the poisonous agent of the paint. The chloride of zinc in the tar preparation acts as a deodorizer, and as a poison.

Having thus described my invention, what I claim as new and desire to secure by Letters Patent is—

1. An anti-fouling paint composed of a pigment, mercurous chloride, and a vehicle consisting of coal tar, chloride of zinc and oil of turpentine, substantially as herein described.

2. An anti-fouling paint, composed of the peroxide of iron, mercurous chloride, and a vehicle consisting of coal tar, chloride of zinc and oil of turpentine, substantially as herein described.

3. A vehicle for an anti-fouling paint containing mercury as the poisonous agent, the same consisting of coal tar, chloride of zinc and oil of turpentine, substantially as herein described.

In witness whereof I have hereunto set my hand.

ANSON L. MUNSON.

Witnesses:
S. H. NOURSE,
J. A. BAYLESS.